No. 748,489. PATENTED DEC. 29, 1903.
R. L. EBY & J. W. WEAVER.
SAUSAGE STUFFER.
APPLICATION FILED FEB. 13, 1903.
NO MODEL. 2 SHEETS—SHEET 1.
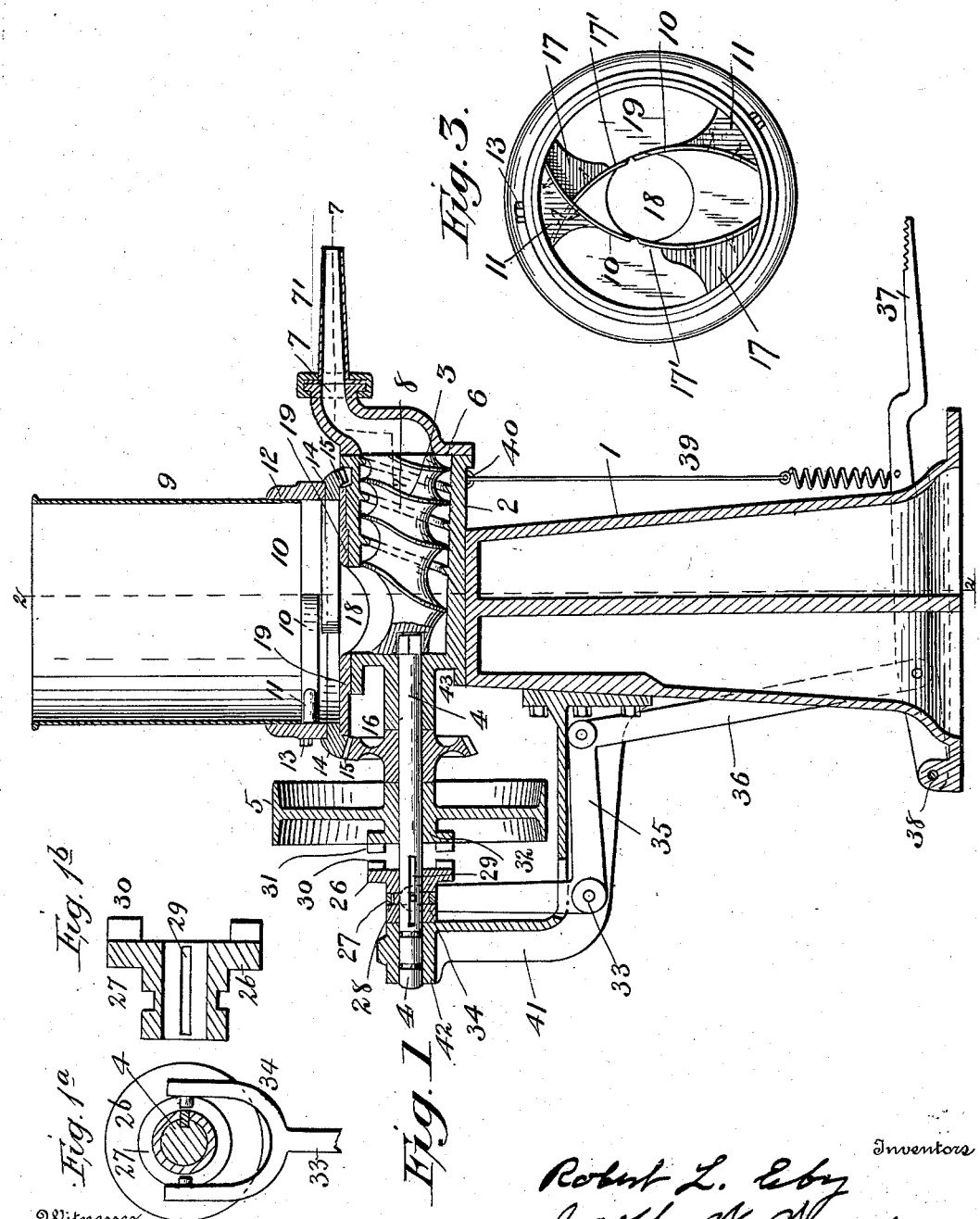
Witnesses
F. L. Orraud
W. Parker Rinodel
Inventors
Robert L. Eby
Joseph W. Weaver
By D. G. Rinodel
Attorney No. 748,489. PATENTED DEC. 29, 1903.
R. L. EBY & J. W. WEAVER.
SAUSAGE STUFFER.
APPLICATION FILED FEB. 13, 1903.
NO MODEL. 2 SHEETS—SHEET 2.
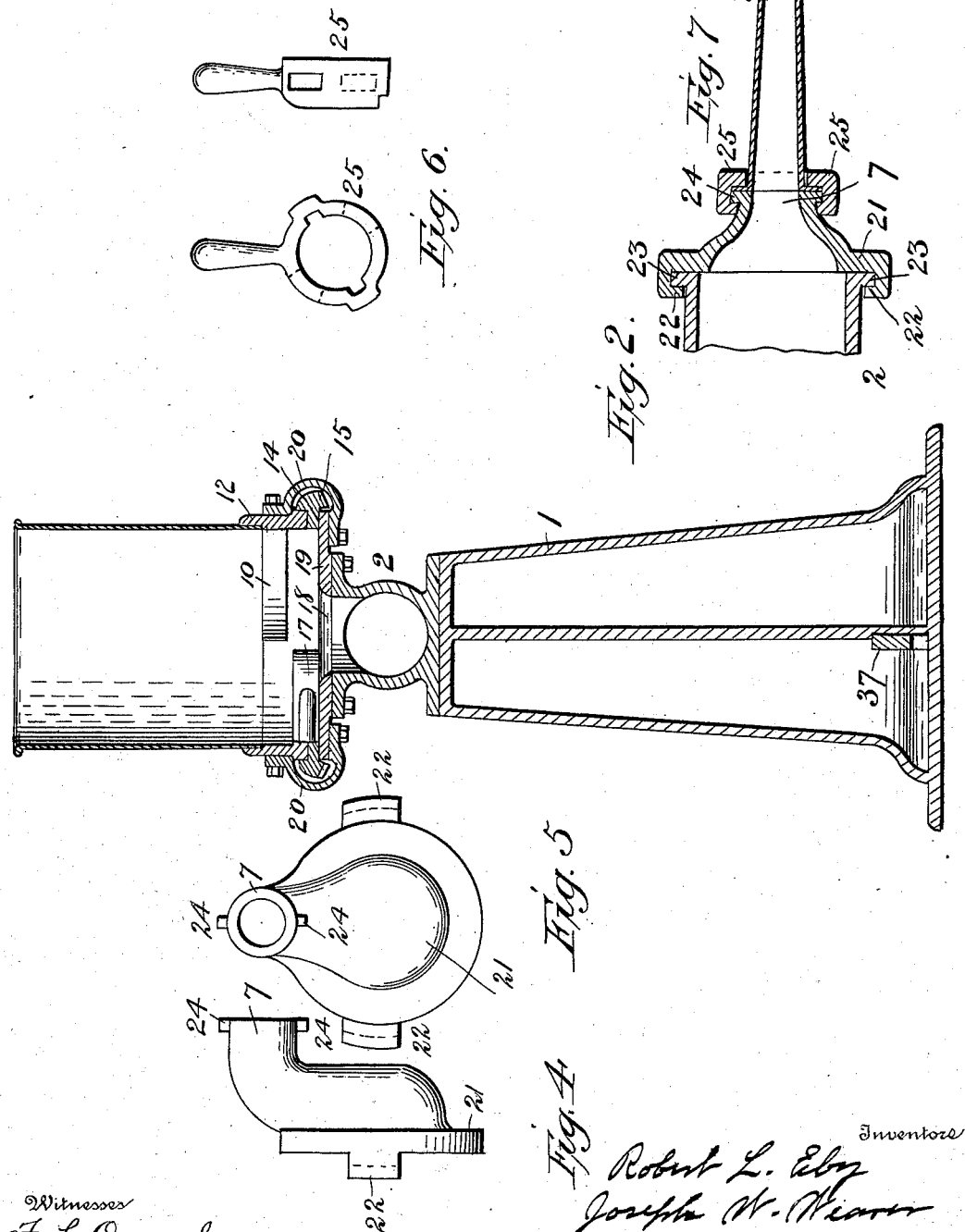
Witnesses
F. L. Ouraud.
W. Parker Reinold.
Inventors
Robert L. Eby
Joseph W. Weaver
By D. C. Reinohl
Attorney No. 748,489. Patented December 29, 1903.

UNITED STATES PATENT OFFICE.

ROBERT L. EBY AND JOSEPH W. WEAVER, OF LEBANON, PENNSYLVANIA; SAID WEAVER ASSIGNOR TO SAID EBY.

SAUSAGE-STUFFER.

SPECIFICATION forming part of Letters Patent No. 748,489, dated December 29, 1903.

Application filed February 13, 1903. Serial No. 143,180. (No model.)

*To all whom it may concern:*

Be it known that we, ROBERT L. EBY and JOSEPH W. WEAVER, citizens of the United States, residing at Lebanon, in the county of Lebanon and State of Pennsylvania, have invented certain new and useful Improvements in Sausage-Stuffers; and we do hereby declare the following to be a full, clear, and exact description of the invention, such as will enable others skilled in the art to which it appertains to make and use the same.

Our invention relates to sausage-stuffers; and it has for its object the production of a continual-feed stuffer in which the meat is fed continuously into the cylinder and not intermittently, as is the present prevailing practice; and it consists in certain improvements in construction which will be fully disclosed in the following specification and claims.

In the accompanying drawings, which form part of this specification, Figure 1 is a vertical longitudinal section of a machine embodying our invention; Fig. 1ª, a transverse section through the clutch; Fig. 1ᵇ, a longitudinal section of the same; Fig. 2, a vertical transverse section on line 2 2, Fig. 1, the screw conveyer being omitted; Fig. 3, a top plan view of the hopper; Fig. 4, a side elevation of the head of the conveyer-cylinder; Fig. 5, an end view of the same; Fig. 6, a plan and side elevation of the coupling for connecting the spout to the cylinder; and Fig. 7, a horizontal section through the end of the conveyer-cylinder, its head, and the spout on line 7 7, Fig. 1.

Reference being had to the drawings and the designating characters thereon, 1 indicates the base or stand of the machine; 2, the conveyer-cylinder, supported on the upper end of the stand in which the screw conveyer 3, driven by a shaft 4, supported in the rear head of the cylinder 2, having a pulley-wheel 5, revolves to force the meat in the conveyer-cylinder 2 through the opening or discharge end 6 of the cylinder and on through into the nozzle 7 into the spout 7' into the sausage-casing.

In the conveyer-cylinder 2 are spiral ribs 8, which prevent the meat from revolving with the screw conveyer 3 and are located between the convolutions of the screw.

Mounted on the conveyer-cylinder 2 is a stationary meat-hopper 9, having blades 10 secured to lugs 11, which are attached to the annular base 12 by bolts 13.

Under the base 12 is an annular plate 14, having a bevel-gear 15, which engages or meshes with the bevel gear-wheel 16, mounted on the shaft 4. Secured to the annular plate 14 and forming part thereof are lugs 17, to which are secured blades 17'. As the annular plate 14 is turned or rotated the blades engage the meat in the hopper 9 and force it toward the center or opening 18 in the bottom 19 of the hopper.

The hopper 9 is secured to the top of the conveyer-cylinder 2 by means of clips 20, which engage the base 12 and the bottom 19.

At the discharge end 6 of the conveyer-cylinder 2 is a head 21, having lugs 22, which engage with the lugs 23 on the cylinder 2. At the outer end of the nozzle 7 are projections 24, which are engaged by a coupling 25 to secure the spout 7' to the nozzle.

Mounted on the shaft 4 is a clutch 26, having a ring 27 engaging a groove 28 in the neck of the clutch, and the clutch is secured to the shaft 4 by means of key 29, so that as the clutch is thrown into engagement with the loosely-mounted pulley-wheel 5 the lugs 30 on the clutch 26 engage the projections or lugs 31 on the hub 32 of the pulley 5.

Connected to the clutch 26 is a bell-crank lever 33, having a yoke 34, which is connected to the ring or collar 27 on the clutch. To the arm 35 of the lever 33 is attached a link 36, which is pivotally secured to the foot-lever or treadle 37, which is pivotally secured to the stand or frame 1 by a pin 38.

To the treadle 37 is secured a spring-rod 39, and the opposite end of the said rod is attached to the conveyer-cylinder 2 at 40.

The clutch mechanism is of ordinary construction, is used in many kinds of machines, and forms no part of our invention.

To the stand 1 is connected a bracket or arm 41, carrying a bearing 42 for supporting the outer end of the shaft 4, the other end of which is supported in the head 43 of the screw conveyer cylinder 2 and engages the screw conveyer 3 therein.

As the operator presses his foot down on the treadle 37 the bell-crank lever 33, the arm 35, and the link 36 are operated and throw the clutch into engagement with the driving or pulley wheel 5, and that in turn revolves the screw conveyer 3 and the annular plate 14.

Having thus fully described our invention, what we claim is—

1. A sausage-stuffer having a horizontal cylinder, a meat-conveyer in said cylinder, a hopper having a bottom provided with a central discharge and supported on said cylinder, and having fixed horizontal blades secured to the base of the hopper, and revoluble blades under the fixed blades for feeding meat continuously from the hopper into the cylinder.

2. A sausage-stuffer having a horizontal cylinder, a meat-conveyer in said cylinder, a hopper having a bottom provided with a central discharge and supported on the cylinder, and having fixed horizontal blades secured to the base of the hopper, and an annular revoluble plate provided with horizontal blades and located under the base of the hopper and its fixed blades.

3. A sausage-stuffer having a horizontal cylinder, a screw conveyer in said cylinder, a shaft connected to the conveyer, a miter gear-wheel on said shaft, a hopper having a bottom provided with a central discharge and having fixed curved horizontal blades, an annular plate having horizontal blades attached thereto, revoluble between said fixed blades and the bottom and said annular plate provided with an annular gear engaging said miter-gear, and means for connecting said shaft with a source of power.

4. A sausage-stuffer having a horizontal cylinder, a screw conveyer in said cylinder, a hopper having a bottom provided with a central discharge and having fixed horizontal blades, an annular plate having horizontal blades attached thereto, revoluble between said fixed blades and the bottom, and provided with an annular gear, a driving-shaft, a miter-gear engaging said annular gear, a pulley, and a clutch mechanism on said shaft.

5. A sausage-stuffer having a horizontal cylinder, a screw conveyer in said cylinder, a fixed hopper having horizontal blades secured to the inside of the wall thereof, and having a bottom provided with a central discharge-opening, and an annular plate revolubly supported under said blades and provided with horizontal feed-blades, and means for operating the screw conveyer and the feed-blades synchronously.

In testimony whereof we affix our signatures in presence of two witnesses.

ROBERT L. EBY.
JOSEPH W. WEAVER.

Witnesses:
JOHN H. WILL,
CALIVIR LENTZ.